United States Patent [19]

Harbauer

[11] 3,976,353

[45] Aug. 24, 1976

[54] TERMINAL FOR ELECTRIC CONDUCTORS

[75] Inventor: Werner Harbauer, Schwandorf, Germany

[73] Assignee: Siemens Aktiengesellschaft, Munich, Germany

[22] Filed: Mar. 26, 1975

[21] Appl. No.: 562,051

[30] Foreign Application Priority Data

Apr. 4, 1974 Germany............................ 2416441

[52] U.S. Cl. ............................................... 339/274
[51] Int. Cl.² ........................................... H01R 7/06
[58] Field of Search................... 339/249, 270, 274; 24/134 R; 403/213, 235, 398

[56] References Cited
UNITED STATES PATENTS

| | | | |
|---|---|---|---|
| 2,730,691 | 1/1956 | Nelson | 339/274 |
| 3,873,178 | 3/1975 | Galli | 339/95 R |

Primary Examiner—Joseph H. McGlynn
Attorney, Agent, or Firm—Kenyon & Kenyon Reilly Carr & Chapin

[57] ABSTRACT

A terminal for an electric conductor is disclosed in which a cylindrical clamping member rotatable in a clamping frame is provided with clamping faces which are arranged eccentrically and which protrude beyond the cylindrical portion of the member. More particularly, the clamping surfaces are formed by circumferential surfaces of two spaced disks which, in turn, are formed in part from and supported by the aforesaid cylindrical portion. Additionally, for receiving the conductor, the clamping frame is provided with an opening which is outside and extends lengthwise of the cylindrical portion. After insertion of the conductor in such opening, rotation of the clamping member causes the conductor to be pressed between the clamping surfaces and the clamping frame, thereby substantially increasing the pull-out forces associated with the conductor.

With the present terminal, rotation of the clamping member is realized in a manner which permits the tool which is used to rotate the member to be inserted in a direction parallel to the direction of insertion of the conductor.

7 Claims, 8 Drawing Figures

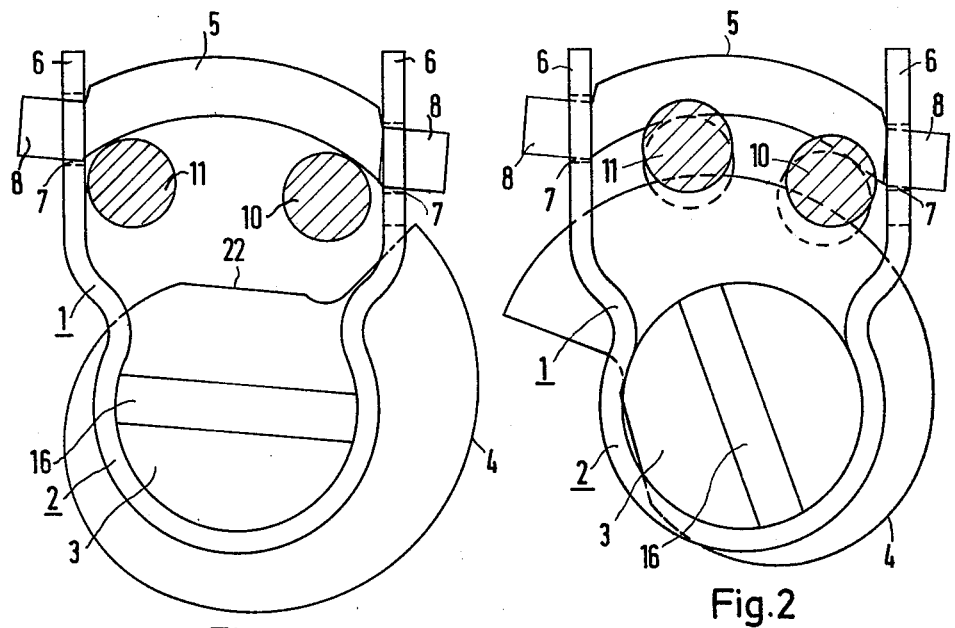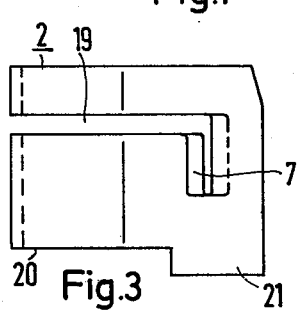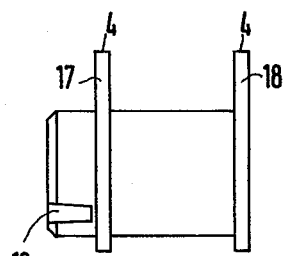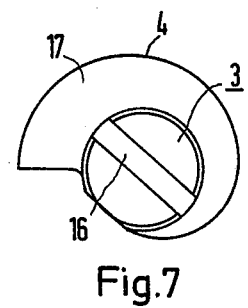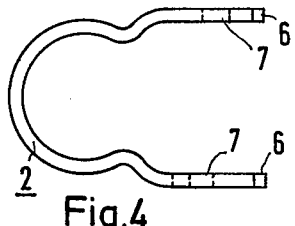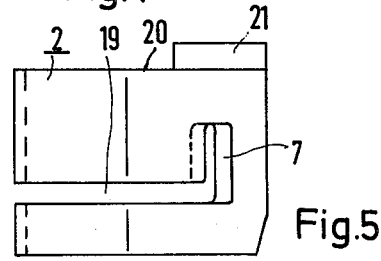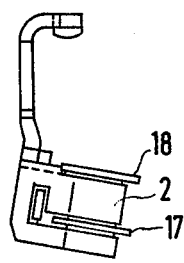

TERMINAL FOR ELECTRIC CONDUCTORS

BACKGROUND OF THE INVENTION

1. Field of the Invention

The invention relates to a terminal for electric conductors and, in particular, to a terminal of a type which includes a cylindrical clamping member rotatable in a clamping frame which clamps the conductor.

2. Description of the Prior Art

In a known terminal for electric conductors, a substantially cylindrical clamping member is rotatably mounted in the bottom opening of a bowl-shaped clamping frame which has, adjacent to the circumference of the cylindrical clamping member, a narrowing groove which receives a conductor and extends in spiral form around the axis of rotation. In this terminal, the direction of insertion of the conductor and the direction for applying a tool as, for example, a screwdriver, to rotate the clamping member are at an angle of 90°. Further, in this terminal only one conductor can be clamped, and the conductor must, additionally, be adapted to the dimensions of the groove. Moreover, turning back of the securing screw located in the spiral groove cannot be avoided when vibrations or temperature fluctuations occur, as the clamping frame is large and is made of a different material than the clamping member.

In another known terminal for electrical conductors, the clamping member has cylindrical bearing pins for rotatably mounting the member in the lateral legs of a U-shaped clamping frame. The clamping member is also provided with clamping faces, eccentric to the bearing pins, for engaging the conductor which makes contact at the base of the U. With this arrangement, the direction of insertion of the conductor and the direction for applying a tool to rotate the clamping member are also at an angle of 90°, so that, as with the previous terminal, a relatively large amount of space is required when using the terminal.

It is an object of the present invention to provide a conductor terminal in which the direction of insertion of the conductor is parallel to the direction of insertion of the tool which operates the terminal.

It is a further object of the present invention to provide a conductor terminal which has better holding properties under vibratory or swinging stress and which has increased pullout forces.

SUMMARY OF THE INVENTION

In accordance with the principles of the present invention, the above and other objectives are accomplished by a terminal comprising a clamping member having a cylindrical portion which forms part of and supports two spaced disk portions. The disk portions have circumferential surfaces which are eccentric to the cylindrical portion and which form clamping surfaces for the clamping member. The latter member, in turn, is rotatably supported by a clamping frame having an opening which is outside and extends lengthwise of the cylindrical portion. The aforesaid opening is provided for receiving a conductor which, upon rotation of the cylindrical portion of the clamping member, is pressed by the eccentric clamping surfaces against the clamping frame. A slot is also provided in the cylindrical portion such that a tool applied in the lengthwise direction of the portion can be used to rotate such portion.

To obtain as extensive as possible a deformation of the conductor without damaging it, it is advantageous to dispose the disks so that one of the clamping faces lies outside the zone of a pressure plate held in the frame. Also, it is further advantageous if one disk is disposed within a slot provided in the clamping frame and the other disk is made to slide along the outer edge of the frame. In such case, the latter disk can form one end face of the cylindrical portion of the clamping member.

To clamp two conductors of equal cross-section uniformly, it is advantageous to provide the clamping frame with U-shaped arms of unequal length for holding the pressure plate. Additionally, the pressure plate may be the fixed contact part of a switchgear. Moreover, by providing that at least parts of the clamping member are rotatably guided in the clamping frame so as to grip, the terminal can always be supplied in an open state. In such case, it is then no longer possible to turn the terminal open when turning a clamped-on conductor of large cross-section.

BRIEF DESCRIPTION OF THE DRAWING

An embodiment of the invention will now be discussed in greater detail, making reference to the accompanying drawings, in which:

FIG. 1 shows a top view of a terminal which is in accordance with the invention and which is in its open position;

FIG. 2 shows the terminal of FIG. 1 in partially closed position;

FIGS. 3, 4 and 5 illustrate, respectively, the front, side, and top views of the U-shaped guide member of the terminal of FIG. 1;

FIGS. 6 and 7 show the side and top views of the eccentrically arranged disks of the terminal of FIG. 1; and FIG. 8 illustrates the terminal of FIG. 1 with a fixed contact member employed as the pressure plate thereof.

DETAILED DESCRIPTION

It should be noted that in all the figures similar parts have been designated with similar reference symbols.

FIG. 1 shows a terminal in accordance with the present invention comprising a clamping frame 1 having a guide member 2 which guides a cylindrical clamping member 3 having eccentrically arranged clamping faces 4. The latter surfaces, advantageously can follow spiral paths, as illustrated.

As shown, the terminal also includes a pressure plate 5 which is held in the arms 6 of the guide member 2 by the projections 8 which extend through openings 7 of the arms. An insertion opening is also provided between the pressure plate 5 and the member 3 for receiving a pair of conductors 10 and 11. As will be explained below, these conductors are deformed by rotating the clamping member 3 from the position shown in FIG. 1 to that shown in FIG. 2 in such a way that the pull-out forces of the conductors are relatively great. As can be observed, the openings 7 of the legs 6 are at different distances from the pivot point of the clamping member 3, so that the distance between the pressure plate 5 and the eccentric face 4 decreases as the conductors 10 and 11 move clockwise.

In accordance with the invention and as shown in FIG. 6, the clamping faces 4 are formed by the circumferential surfaces of two spaced disk portions 17 and 18, which protrude from the cylindrical portion of member 3. Thus, as above-indicated, upon rotation of the member 3 and, hence, the protruding disks 17 and 18, the conductors 10 and 11 are crowded between the two disks so that the pull-out forces for the conductors are greatly increased. For the rotation of the clamping member 3, a slot 16 is provided in the member for receiving a screwdriver or other tool. Additionally, as shown, the clamping frame 1 is provided with a slot 19 which houses and guides the disk 17. The disk 18, on the other hand, is arranged so it bears against the outer edge 20 of the clamping frame 1.

As illustrated, the pressure plate 5 has a width equal to that of the openings 7, so that the conductors 10 and 11 become deformed along the plate under the influence of the disk 18. The outer edge 20 of the clamping frame 1 is, moreover, shown as being topped by a shoulder 21 whose depth essentially corresponds to the width of the disk 18, thereby providing a smooth end surface for the terminal and permitting it to be easily installed within a housing. Additionally, as shown in FIG. 1, the clamping member 3 is advantageously equipped with a flat portion 22 which, as the clamping member 3 is rotated in the presence of thick conductors, causes the conductors to make contact at the arm 6 whose opening 7 is farther removed from the end of the arm.

What is claimed is:

1. In a terminal for an electric conductor including a clamping frame, a cylindrical clamping member rotatably mounted in said frame, said clamping member including a slot-like opening in one endface thereof for receiving a tool for rotating said clamping member and two eccentrically disposed clamping surfaces which protrude beyond said clamping member, and a conductor insertion opening in said clamping frame adjacent said clamping member, the longitudinal axis of said clamping member being parallel to the longitudinal axis of said conductor insertion opening, the improvement comprising two spaced-apart disc-shaped portions, eccentrically disposed on and protruding beyond the surface of said clamping member, the circumferential surfaces of said disc-shaped portions forming said clamping surfaces for said member.

2. A terminal in accordance with claim 1 in which rotation of said clamping member causes at least portions of said clamping member to be guided by said frame so as to grip.

3. A terminal in accordance with claim 1 in which said frame includes a slot adapted to house therein one of said disk portions and in which said other disk portion is adjacent to the outer edge of said frame.

4. A terminal in accordance with claim 3 in which one of said disk portions is formed at one end surface of said cylindrical portion.

5. A terminal in accordance with claim 1 in which said frame includes a pressure plate which is adjacent to said opening and in which one of said clamping surfaces lies outside the zone of said pressure plate.

6. A terminal in accordance with claim 5 in which said frame includes U-shaped arm members of unequal length and said plate is supported in said arm members.

7. A terminal in accordance with claim 5 in which said plate is a fixed contact part of a switchgear.

* * * * *